Aug. 11, 1964  F. W. FORK  3,144,505
NON-METALLIC ELECTRICAL DUCT WITH EMBEDDED GROUND WIRE
Filed Aug. 24, 1961
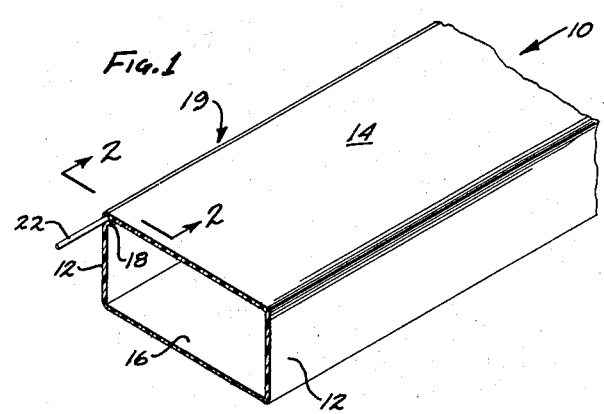
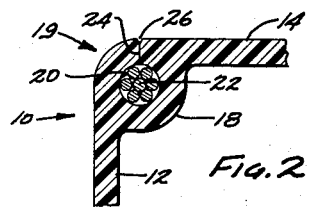
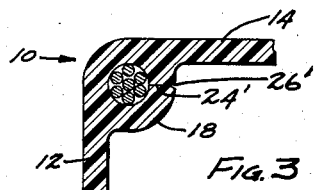
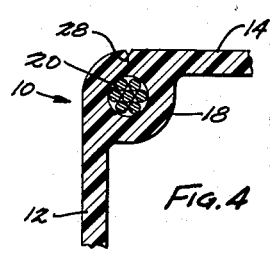
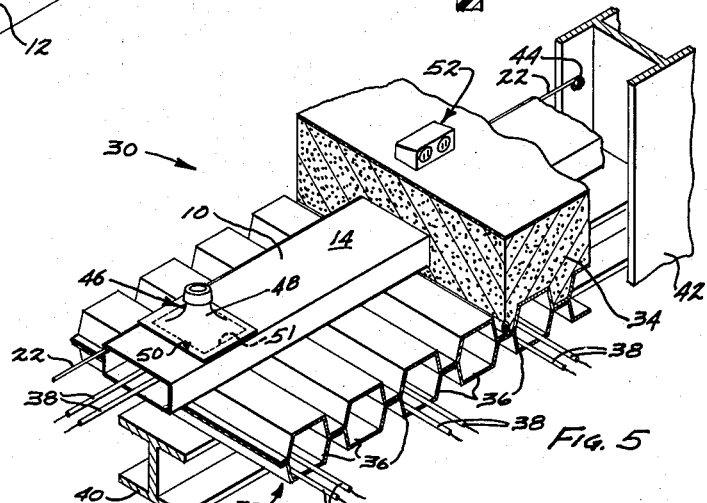
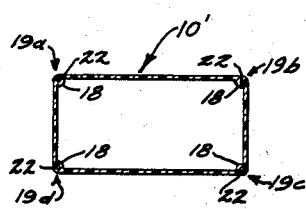
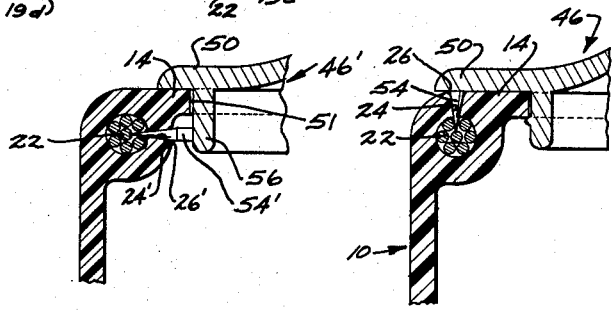
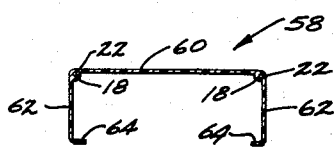
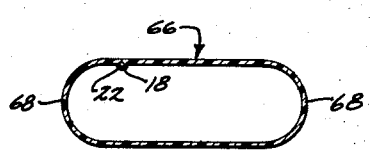
INVENTOR.
FRANK W. FORK,
BY *Harry B. Keck*
ATTORNEY

United States Patent Office 3,144,505
Patented Aug. 11, 1964

3,144,505
NON-METALLIC ELECTRICAL DUCT WITH
EMBEDDED GROUND WIRE
Frank W. Fork, Pittsburgh, Pa., assignor to
H. H. Robertson Company
Filed Aug. 24, 1961, Ser. No. 133,691
3 Claims. (Cl. 174—70)

The present invention relates to an electrical duct for use in electrical distribution systems and more particularly to a non-metallic duct having electrical grounding means.

The primary object of this invention is to provide a non-metallic duct that may be used as an electrical wiring distributing duct.

Another object of this invention is to provide a non-metallic duct that may be used as an under-floor cross-over duct in combination with cellular steel flooring wherein the cross-over duct serves to distribute the electrical wiring in a direction transversely of the cellular steel flooring.

Still another object of this invention is to provide a non-metallic duct having a grounding element which grounding element provides an electrical ground directly to the structural framework of a building.

Yet another object of this invention is to provide a non-metallic duct that is lightweight and relatively inexpensive to manufacture.

These and other objects and advantages of the present invention will become apparent from the following detailed description by reference to the accompanying drawings in which:

FIGURE 1 is a fragmentary isometric view of the preferred embodiment of the present non-metallic duct;

FIGURE 2 is a cross-sectional view taken along the line 2—2 of FIGURE 1 and particularly illustrating the electrical grounding element of the present invention;

FIGURES 3 and 4 are cross-sectional views, similar to FIGURE 2, illustrating alternative configurations;

FIGURE 5 is a fragmentary isometric view of a building floor structure embodying the present non-metallic duct;

FIGURES 6 and 7 are fragmentary cross-sectional views of the embodiments of FIGURES 2 and 3 respectively including a portion of a base cup shown in FIGURE 5 and particularly illustrating the use of the electrical grounding elements; and FIGURES 8, 9 and 10 are transverse cross-sectional views illustrating alternative embodiments of the present non-metallic duct.

Referring to FIGURES 1 and 2, the preferred embodiment of the present invention will now be described. As shown, the present invention comprises a duct 10 having side walls 12, an upper wall 14 and a bottom wall 16. A longitudinal rib 18 is preferably positioned at the juncture of a pair of adjacent side walls as indicated at 19. The phrase "pair of adjacent side walls" as used in this specification and in the claims means—any two adjacent side walls which meet, for example, the upper wall 14 and one of the side walls 12, or the bottom wall 16 and one of the side walls 12. As shown, the longitudinal rib 18 is disposed at the juncture of the upper wall 14 and one of the side walls 12.

The longitudinal rib 18 includes a passageway 20. A grounding element such as a grounding wire 22 is retained within the passageway 20. The longitudinal rib 18, the passageway 20 and the grounding wire 22 preferably extend the entire length of the duct 10.

According to the present invention, the duct 10 preferably comprises a plastic material such as polyethylene, polypropylene, glass-reinforced polyester resin, polystyrene, polyamides, polycarbonate, polyvinyl halides, and similar impact-resistant materials.

The plastic material preferably should have electrical insulating properties so that the grounding element 22 is protected along its entire length.

Alternatively the duct 10 could comprise fiberboard, cardboard and the like.

As best seen in FIGURE 2, the longitudinal rib 18 includes a continuous cut or split 24 in the wall thereof. The continuous cut 24 is preferably positioned externally of the duct 10 and extends through one wall and for the entire length of the longitudinal rib 18. The continuous cut 24 provides communication to the grounding wire 22 for grounding lugs (to be described later in FIGURES 6 and 7) without mutilation of the duct 10.

A groove 26 is provided in the surface of the rib 18 at the end of the continuous cut 24. The groove 26 serves as a guide or starter for the grounding lugs here-in-above mentioned.

Alternatively, as shown in FIGURE 3, the continuous cut may be positioned internally of the duct 10 as indicated at 24'. A groove 26' is provided in the surface of the rib 18 at the end of the cut 24'.

A further alternative embodiment of the continuous cut is illustrated in FIGURE 4 and comprises a continuous cut 28 which penetrates substantially through the wall of the rib 18 to a point adjacent to the passageway 20.

Hence, the present invention provides a non-metallic duct 10 that is lightweight and relatively inexpensive to manufacture. The continuous cut 24 or 24' not only provides communication to the grounding wire 22 but also provides a path through which the grounding wire 22 may be conveniently inserted into the passageway 20. The continuous cut 28 is used where the duct 10 is fabricated from material that is readily penetrable with a pointer implement.

The duct 10 may be used alone as an electrical wiring distributing duct or in combination with cellular steel flooring (as will be described in FIGURE 5) as a cross-over duct. Further, the grounding wire 22 provides a convenient, built-in path for grounding spurious voltages.

A specific use of the duct 10 will now be described with reference to FIGURE 5. Herein shown is a building floor structure indicated by the numeral 30 which floor structure 30 comprises a cellular steel subfloor 32 having a layer of concrete 34 thereon. The cellular steel subfloor 32 comprises a plurality of spaced parallel cells 36 each serving as an electrical raceway for distributing electrical conductors 38 throughout the building. The building floor structure 30 is supported on the structural framework of the building, for example beam 40 and vertical column 42.

The duct 10, of the present invention, is secured to the cellular steel subfloor 32 in transverse relation to the cells 36. The duct 10 thus serves to distribute the electrical conductors 38 in a direction transversely of the cells 36.

The grounding wire 22 extends the entire length of the duct 10 and is secured to the structural framework of the building—as for example to the vertical column 42 as indicated at 44. Hence a grounding path is established leading directly to the structural framework. It will be noted that the grounding wire 22 is insulated from the cellular steel subfloor 32.

As shown, a base cup 46 is secured to the upper wall 14 of the duct 10. The base cup 46 comprises a body portion 48 extending upwardly to the level of the concrete and a flanged base 50 resting on the upper wall 14. The flange base 50 surrounds a cable passageway 51, shown in phantom outline, in the upper wall 14. Thus the electrical conductors 38 pass through the cable passageway 51, through the base cup 46 to an electrical fitting such as the outlet unit 52 or the like.

Normally the base cup 46 and the outlet unit 52 are metallic elements and thus require grounding. Referring to FIGURE 6, the base cup 46 includes a plurality of grounding lugs such as spikes 54. To install the base cup 46 on the duct 10 having the continuous cut 24 (see FIGURE 2), the point of the spikes 54 is engaged in the groove 26 (see FIGURE 2). The base cup 46 is then pressed downwardly until the flanged base 50 rests on the upper wall 14. The spikes 54 will pass through, the continuous cut 24 and penetrate the grounding wire 22. The base cup 46 is now electrically grounded.

Referring to FIGURE 7, alternatively a base cup 46' includes grounding lugs such as spikes 54' which project horizontally from lip 56 depending from the flanged base 50. The base cup 46' is utilized in the duct 10 having the continuous cut 24' (see FIGURE 3). To install the base cup 46' the rim of the cable passageway 51 is inserted between the flanged base 50 and the spikes 54'. The point of the spikes 54' is engaged in the groove 26' (see FIGURE 3) and by means of a horizontal push the spike 54' passes through the continuous cut 24' to penetrate the grounding wire 22. The base cup 46' is now electrically grounded.

It will be noted, in FIGURES 6 and 7, that the groove 26, 26' serves as a starting point for centering and guiding the spikes 54, 54' directly to the grounding wire 22.

Alternative embodiments of the present duct are illustrated in FIGURES 8, 9 and 10. In FIGURE 8 a duct 10' includes a plurality of the longitudinal ribs 18 disposed at the juncture of the pairs of adjacent side walls 19a, 19b, 19c and 19d. Each of the ribs 18 includes one of the grounding wires 22. It should be evident that the duct 10' may include only the ribs 18 which lie in the adjacent corners 19a, 19b. Further the duct 10' may include only the ribs 18 which lie in the opposite corners 19a, 19c.

In FIGURE 9 a duct forming element 58 is generally U-shaped and includes a horizontal web 60, depending legs 62 and an inward horizontal flange 64 at the lower end of each of the depending legs 62. The duct forming element 58 also includes the ribs 18 and the grounding wires 22.

The duct forming element 58 is adapted to rest on the inward horizontal flanges 64. When the duct forming element 58 is installed on a flat surface, as for example a floor, the flat surface serves as the bottom wall and a complete duct is formed. When the duct forming element 58 is installed, as for example, on the cellular steel subfloor 32, it is desirable to place a layer of heavy paper or the like beneath the inward horizontal flanges 64 to prevent the ingress of concrete when the layer of concrete 34 is poured. In this instance, the layer of heavy paper serves as the bottom wall to form a complete duct.

In FIGURE 10 there is illustrated a duct 66 which is similar to the duct 10, of the preferred embodiment, with the exception that the duct 66 has curved side walls 68. The curved side walls 68 increase the electrical wire carrying capacity of the duct. The duct 66 also includes at least one of the ribs 18 and the associated grounding wire 22. The duct 66 instead may include a plurality of the ribs 18 and the grounding wire 22.

According to the provision of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:
1. In an electrical distribution system, the combination comprising:

a non-metallic duct having pairs of opposed walls defining an interior space adapted to receive insulated, current conducting cables, one of said walls having at least one cable passageway;
a grounding element embedded within one of said walls adjacent to the said cable passageway and extending the entire length of the said non-metallic duct, said grounding element having no electrical connection with a source of electrical power;
a base cup including a flanged base resting on the said one of said walls and surrounding the said cable passageway; and
at least one grounding lug depending from the said flanged base, said grounding lug penetrating the said non-metallic duct and the said grounding element whereby the said base cup is electrically grounded.

2. In an electrical distribution system, the combination comprising:

a non-metallic duct having a top wall, a bottom wall and side walls defining an interior space adapted to receive insulated, current conducting cables, said top wall having at least one cable passageway;
a grounding element embedded within the material of said non-metallic duct disposed at the juncture of said top wall and one of said side walls, said grounding element extending the entire length of said non-metallic duct, said grounding element having no electrical connection with a source of electrical power;
a base cup including a flanged base resting on the said top wall and surrounding the said cable passageway; and
at least one grounding lug extending perpendicularly from the said flanged base, said grounding lug penetrating the said top wall and the said grounding element whereby the said base cup is electrically grounded.

3. In an electrical distribution system, the combination comprising:

a non-metallic duct having a top wall, a bottom wall and side walls defining an interior space adapted to receive insulated, current conducting cables, said top wall having at least one cable passageway;
a longitudinal rib disposed at the juncture of said top wall and one of said side walls and interiorly of said non-metallic duct;
a grounding element embedded within the said longitudinal rib, and extending the entire length of said non-metallic duct, said grounding element having no electrical connection with a source of electrical power;
a base cup including a flanged base resting on the said top wall and surrounding the said cable passageway;
a lip member depending from the said flanged base, said lip member extending through the said cable passageway; and
at least one grounding lug extending perpendicularly from the said lip member, said grounding lug penetrating the said longitudinal rib at a point interiorly of the said non-metallic duct and the said grounding element whereby the said base cup is electrically grounded.

References Cited in the file of this patent

UNITED STATES PATENTS

| | | |
|---|---|---|
| 2,066,242 | Abbott | Dec. 29, 1936 |
| 2,274,136 | Frank et al. | Feb. 24, 1942 |
| 2,647,160 | Hood | July 28, 1953 |
| 2,813,143 | Weston | Nov. 12, 1957 |
| 2,894,534 | Kennedy | July 14, 1959 |
| 2,970,286 | Modrey | Jan. 31, 1961 |

FOREIGN PATENTS

| | | |
|---|---|---|
| 814,707 | France | Mar. 22, 1937 |
| 1,135,514 | France | Dec. 17, 1956 |